(12) United States Patent
Roper et al.

(10) Patent No.: US 9,903,509 B2
(45) Date of Patent: Feb. 27, 2018

(54) RISER DEFLECTION MITIGATION

(71) Applicant: Ensco International Incorporated, Wilmington, DE (US)

(72) Inventors: Richard Robert Roper, Katy, TX (US); Xiaochun Shen, Houston, TX (US); Wenzhi Li, Katy, TX (US)

(73) Assignee: Ensco International Incorporated, Wilmington, DE (US)

( * ) Notice: Subject to any disclaimer, the term of this patent is extended or adjusted under 35 U.S.C. 154(b) by 0 days.

(21) Appl. No.: 15/092,817

(22) Filed: Apr. 7, 2016

(65) Prior Publication Data

US 2016/0298791 A1 Oct. 13, 2016

Related U.S. Application Data (60) Provisional application No. 62/144,211, filed on Apr. 7, 2015.

(51) Int. Cl.
*F16L 1/12* (2006.01)
*E21B 17/01* (2006.01)

(52) U.S. Cl.
CPC ............ *F16L 1/123* (2013.01); *E21B 17/017* (2013.01)

(58) Field of Classification Search
USPC ....................................................... 405/211
See application file for complete search history.

(56) References Cited

U.S. PATENT DOCUMENTS

| 6,148,751 | A | * | 11/2000 | Brown | ...................... | B63B 1/34 |
| | | | | | | 114/264 |
| 6,644,894 | B2 | * | 11/2003 | Shu | .......................... | B63B 1/32 |
| | | | | | | 114/243 |
| 2002/0046841 | A1 | | 4/2002 | Shu et al. | | |
| 2003/0099517 | A1 | | 5/2003 | Poldervaart | | |
| 2003/0170076 | A1 | | 9/2003 | Macrea et al. | | |
| 2007/0272414 | A1 | | 11/2007 | Palmer et al. | | |
| 2008/0128138 | A1 | | 6/2008 | Radi | | |
| 2008/0131210 | A1 | * | 6/2008 | Wajnikonis | ........... | B63B 21/502 |
| | | | | | | 405/211 |
| 2009/0185867 | A1 | * | 7/2009 | Masters | .................. | F16L 1/123 |
| | | | | | | 405/216 |

FOREIGN PATENT DOCUMENTS

GB 2517309 A * 2/2015 ............. E21B 41/04

OTHER PUBLICATIONS

PCT Application No. PCT/US2016/026424 PCT International Search Report and Written Opinion dated Jul. 18, 2016.

* cited by examiner

*Primary Examiner* — Kyle Armstrong
(74) *Attorney, Agent, or Firm* — Fletcher Yoder, P.C.

(57) ABSTRACT

Techniques and systems to reduce deflection of a riser extending from an offshore platform. The riser may include a flow guide. The flow guide may receive a fluid. The flow guide may also include one or more outlets that are configured to transmit the fluid. This transmission of the fluid by the one or more outlets may counteract currents or other factors to mitigate deflection in the riser.

20 Claims, 7 Drawing Sheets

FIG. 9

RISER DEFLECTION MITIGATION

CROSS REFERENCE TO RELATED APPLICATIONS

This application is a Non-Provisional application claiming priority to U.S. Provisional Patent Application No. 62/144,211, entitled "RISER DEFLECTION MITIGATION", filed Apr. 7, 2015, which is herein incorporated by reference.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Advances in the petroleum industry have allowed access to oil and gas drilling locations and reservoirs that were previously inaccessible due to technological limitations. For example, technological advances have allowed drilling of offshore wells at increasing water depths and in increasingly harsh environments, permitting oil and gas resource owners to successfully drill for otherwise inaccessible energy resources. To drill for oil and gas offshore, it is desirable to have stable offshore platforms and/or floating vessels from which to drill and recover the energy resources. Techniques to stabilize the offshore platforms and floating vessels include, for example, the use of mooring systems and/or dynamic positioning systems. However, these systems may not always adequately stabilize components descending from the offshore platforms and floating vessels to the seafloor wellhead.

For example, a riser string (e.g., a pipe or series of pipes that connects the offshore platforms or floating vessels to the floor of the sea) may be used to transport drill pipe, casing, drilling mud, production materials or hydrocarbons between the offshore platform or floating vessel and a wellhead. The riser is suspended between the offshore platform or floating vessel and the wellhead, and may experience forces, such as underwater currents, that cause deflection (e.g., bending or movement) in the riser. Acceptable deflection can be measured by the deflection along the riser, and also at, for example, select points along the riser. These points may be located, for example, at the offshore platform or floating vessel and at the wellhead. If the deflection resulting from underwater current is too great, drilling must cease and the drilling location or reservoir may not be accessible due to such technological constraints. Accordingly, it would be desirable to provide techniques to stabilize risers in offshore drilling and energy resource recovery environments.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Systems and techniques for stabilizing a riser (e.g., a riser string) extending from offshore platform, such as a drillship, a semi-submersible platform, a floating production system, or the like, are set forth below. In one embodiment, a flow guide coupled to the riser may transmit fluid across the riser. This fluid may be transmitted in an orthogonal direction with respect to a current so as to create an upstream lift on the riser. This upstream lift may generate an opposing force to that provided by the current and, thus, operate to reduce and/or eliminate downstream deflection that would otherwise be caused by the current. The fluid may be transported along a hose or other similar mechanism clamped onto or otherwise affixed to the riser, for example, in a helical fashion to operate as a baffle (e.g., a flow directing element). In some embodiments, the flow guide may be controllable such that the flow guide is capable of movement in a vertical direction (e.g., along the riser), in a circumferential direction, and/or may be capable of employing angular positioning adjustments.

The riser is typically supported on rig floor of the offshore platform and at the wellhead. Use of a thruster (e.g., a device which creates fluid flow) may add one, or several, points of support to reduce riser string deflection. In some embodiments, there may be a hydraulic or electrical connection to rig floor, and no plumbing may be required. Efficient techniques and devices for providing the thruster force to directly oppose current force experienced by the riser are described below.

Figure 1:
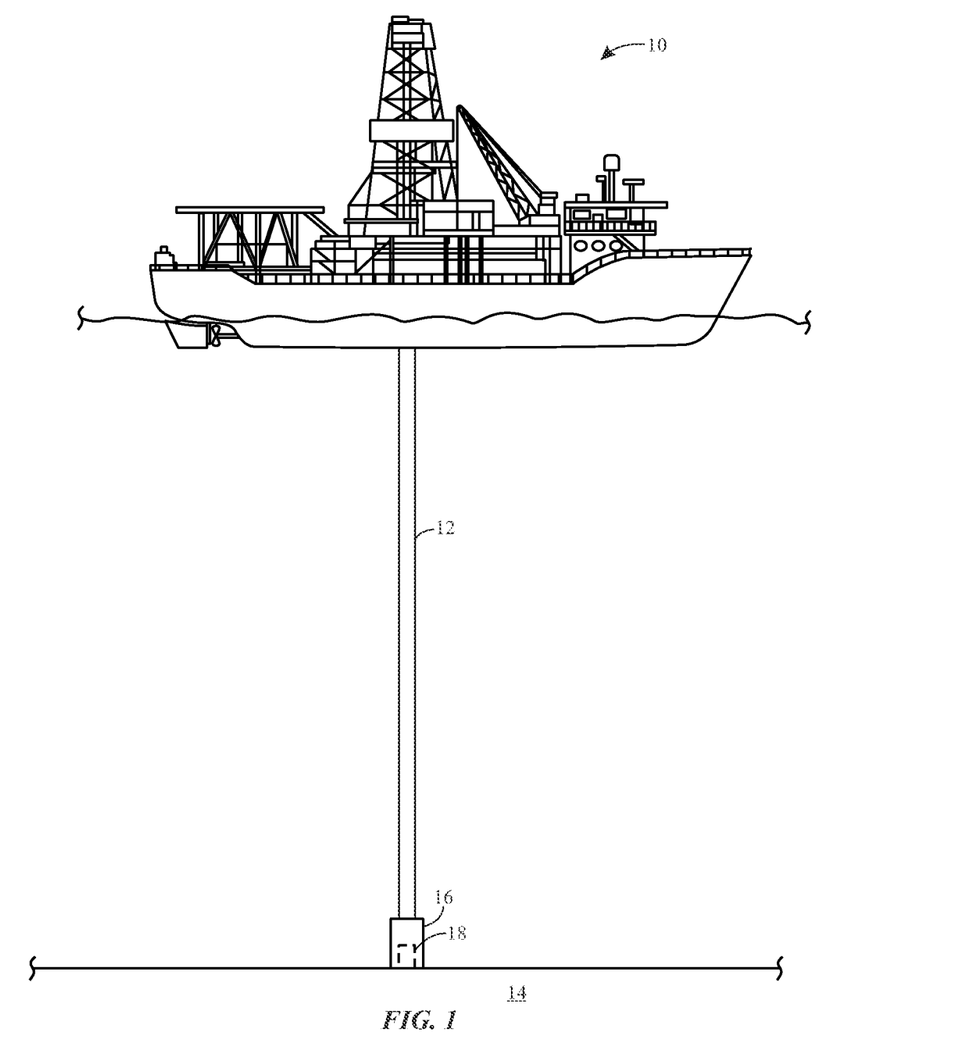
FIG. 1 illustrates an example of an offshore platform having a riser, in accordance with an embodiment.

With the foregoing in mind, FIG. 1 illustrates an offshore platform comprising a drillship 10. Although the presently illustrated embodiment of an offshore platform is a drillship 10 (e.g., a ship equipped with a drill rig and engaged in offshore oil and gas exploration and/or well maintenance or completion work including, but not limited to, casing and tubing installation, subsea tree installations, and well capping), other offshore platforms such as a semi-submersible platform, a floating production system, or the like may be substituted for the drillship 10. Indeed, while the techniques and systems described below are described in conjunction with drillship 10, the stabilization techniques and systems are intended to cover at least the additional offshore platforms described above.

As illustrated in FIG. 1, the drillship 10 includes a riser 12 extending therefrom. The riser 12 may include a pipe or a series of pipes that connect the drillship 10 to the seafloor 14 via, for example, blow out preventer (BOP) 16 that is coupled to a wellhead 18 on the seafloor 14. In some embodiments, the riser 12 may transport produced hydrocarbons and/or production materials between the drillship 10 and the wellhead 18, while the BOP 16 may include at least one valve with a sealing element to control wellbore fluid flows. In some embodiments, the riser 12 may pass through an opening (e.g., a moonpool) in the drillship 10 and may be coupled to drilling equipment of the drillship 10. As illustrated in FIG. 1, it may be desirable to have the riser 12 positioned in a vertical orientation between the wellhead 18 and the drillship 10. However, external factors (e.g., environmental factors such as currents) may disturb the vertical orientation of the riser 12.

Figure 2:
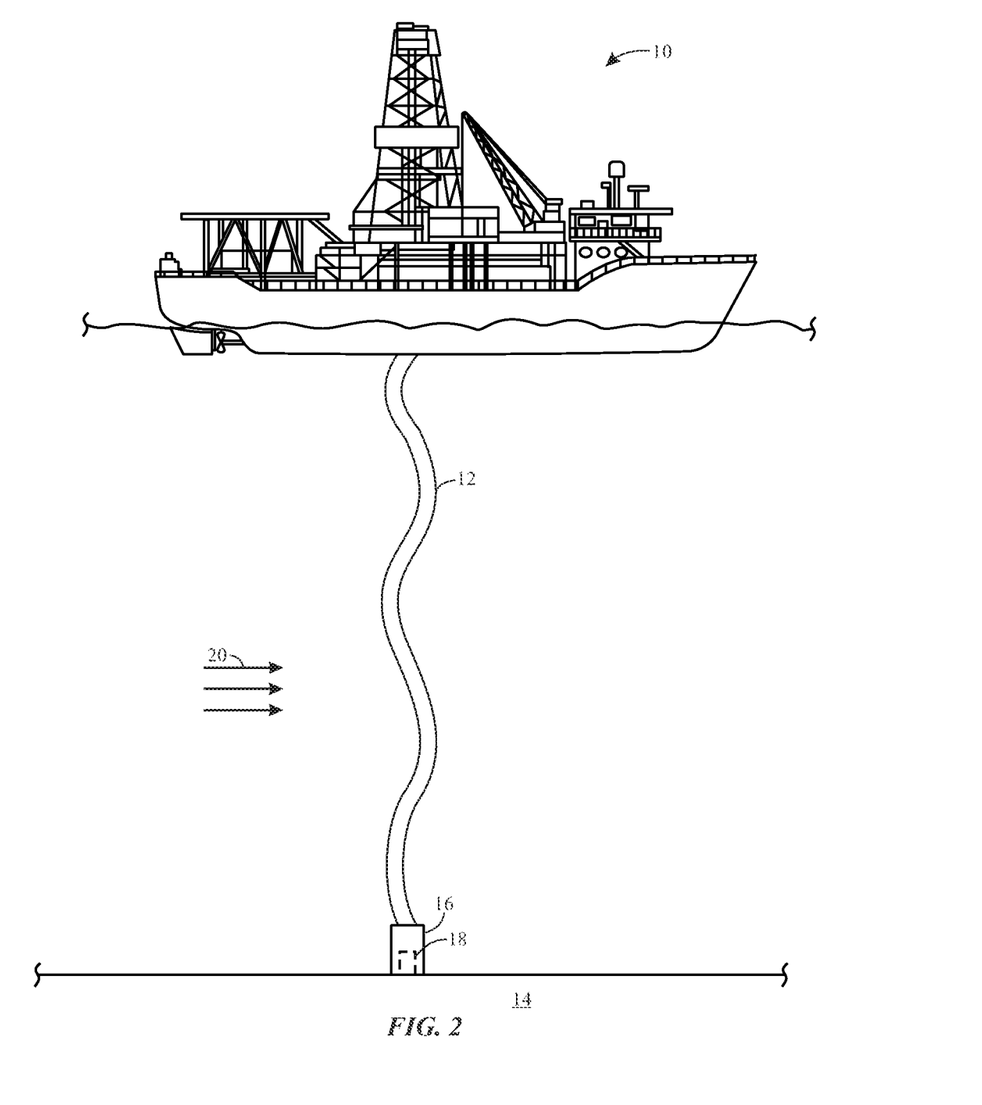
FIG. 2 illustrates an example of the offshore platform of FIG. 1 having a riser experiencing deflection, in accordance with an embodiment.

As illustrated in FIG. 2, the riser 12 may experience deflection, for example, from currents 20. These currents 20 may apply up to and in excess of 100 pounds of force per foot on the riser 12, which causes deflection (e.g., motion, bending, or the like) in riser 12. In some embodiments, this force applied to the riser 12 may cause the riser 12 to contact the edge of the moonpool of the drillship 10. Additionally and/or alternatively, the force applied to the riser 12 from the currents 20 (or other environmental forces) other may cause the riser 12 to stress the BOP 16 or cause key seating, as the angle that the riser 12 contacts the BOP 16 may be affected via the deflection of the riser 12. To reduce the deflection of the riser 12, and to reduce the chances of occurrence of the aforementioned problems caused by riser 12 deflection, one or more systems and techniques may be employed.

Figure 3:
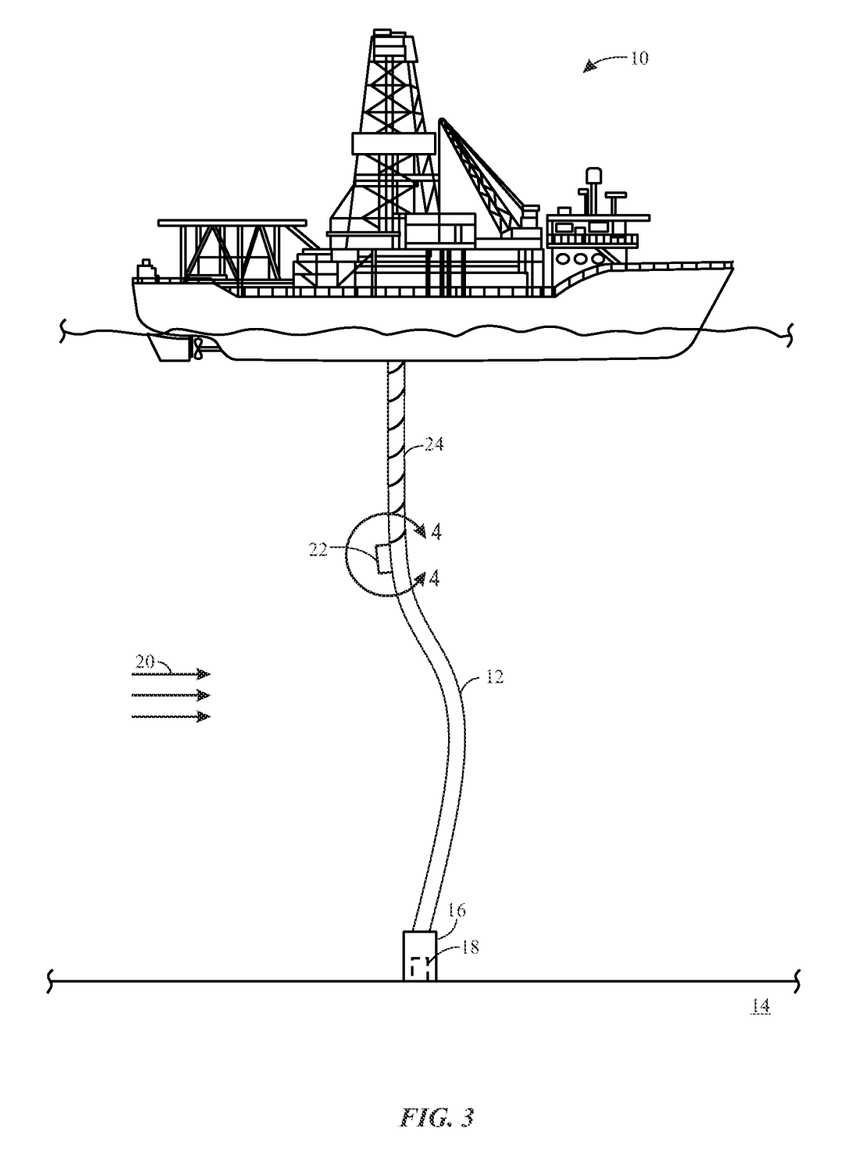
FIG. 3 illustrates a first embodiment of a system to mitigate the deflection of the riser of FIG. 2, in accordance with an embodiment.

FIG. 3 illustrates a first embodiment of a system to mitigate deflection of the riser 12. As illustrated, FIG. 3 includes a flow guide 22 that may be coupled to the riser 12 as well as a hose 24 or a similar mechanism. The flow guide 22 may receive high pressure fluid from the hose 24 and may transmit the fluid across the face of the riser 12 so as to induce an upstream lift (e.g., against the currents 20). The high pressure fluid may be water, air, or another suitable fluid and may be pressurized up to, for example, approximately 500 pounds per square inch (psi), 1000 psi, 2000 psi, or another value or in a range of approximately 500 psi to 2000 psi. In some embodiments, the hose 24 may be clamped or otherwise affixed to the riser 12 in a helical manner, so as to reduce movement of the riser 12 due to vortex shedding or vortex induced vibration from currents 20. The flow guide 22 is shown in greater detail in FIG. 4.

Figure 4:
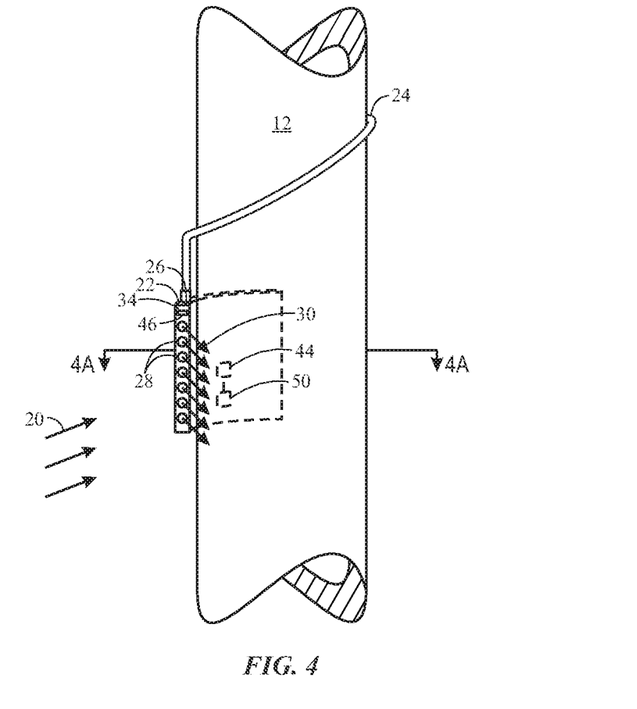
FIG. 4 illustrates a first side view of a portion of the system of FIG. 3 identified by arrows 4, in accordance with an embodiment.
Figure 4A:
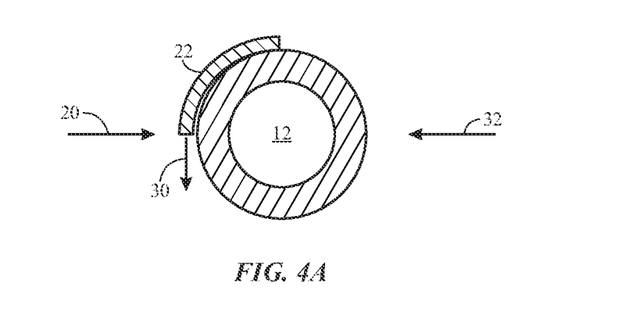
FIG. 4A illustrates a top view of the portion of the system of FIG. 4 identified by arrows 4A, in accordance with an embodiment.

FIG. 4 illustrates a side view of a portion of the system of FIG. 3 identified by arrows 4, and includes flow guide 22. As illustrated, flow guide 22 is coupled to riser 12 in such a manner as to allow for the flow guide 22 to transmit fluid across a face of the riser 12. As illustrated, the fluid may be transmitted from the hose 24 to the flow guide via aperture 26. In some embodiments, the flow guide 22 may at least partially include a plenum that passes the fluid from hose 24 to one or more outlets 28. The flow guide 22 may operate to pass the fluid out of outlets 28 in an direction 30 orthogonal to the currents 20 so as to so as to create an upstream lift 32 on the riser 12 (e.g., causing a countering force to be exerted on the riser 12 in a direction opposite to the flow of currents 20), as illustrated in FIG. 4A. This may reduce deflection of the riser 12. Additionally, the flow guide 22 may include a face 34 that houses the outlets 28. In some embodiments, the face 34 and/or the flow guide 22 itself may be adjustable so that angular positioning adjustments may be made to insure that the fluid is transmitted in a direction 30 orthogonal to the currents 20. Adjustments of the face 34 and/or the flow guide 22 may be made by a controller 44 of the flow guide 22 that receives signals from one or more sensors 46. These sensors 46, for example, may be disposed on the flow guide 22 or on the riser 12 and may sense the flow of the currents 20. The sensors 46 may also sense the position of flow guide 22 and/or may be strain gauge sensors that sense stresses, for example, in the riser 12. Based on these sensed conditions, the controller 44 may cause adjustments of the face 34 and/or the flow guide 22 to be made. In some embodiments, sensor data related to the currents 20 may be transmitted to the drillship 10 and control of the controller 44 of the flow guide 22 may be performed based on the sensor data at the drillship 10 (e.g., remotely from the flow guide 22).

Figure 5:
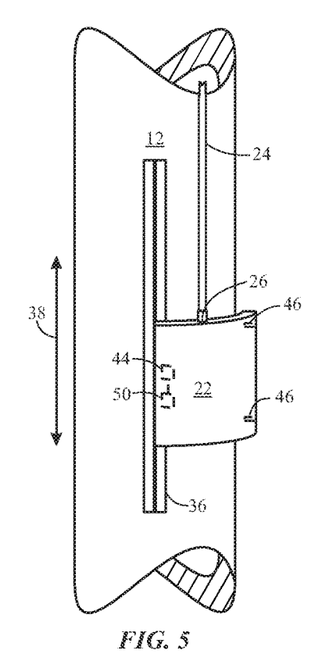
FIG. 5 illustrates a side view of a second embodiment of the portion of the system of FIG. 3 identified by arrows 4, in accordance with an embodiment.

FIG. 5 illustrates an additional side view of the portion of the system of FIG. 3 identified by arrows 4. As illustrated, the flow guide 22 is coupled to the riser 12 via a track 36. The track 36 may allow for movement of the flow guide 22 in a vertical direction 38 along the length of the riser 12. Adjustments of the vertical position of the flow guide 22 in the vertical direction 38 may also be made by a controller 44 of the flow guide 22. In one embodiment, the controller 44 receives signals from one or more sensors 46, for example, disposed on the flow guide 22 or on the riser 12, which sense the flow of the currents 20. Alternatively, the sensors 46 may be strain gauge sensors that sense stresses, for example, in the riser 12. Based on these sensed conditions, the controller 44 may cause adjustments of the face 34 and/or the flow guide 22 to be made. For example, based on the sensed conditions of the currents 20 or strain in a particular region of the riser 12, the controller 44 may cause vertical adjustments of the flow guide 22 to be made to the flow guide 22 in an area of the riser 12 in which the currents 20, for example, are the strongest or where deflection of the riser 12, for example, is greatest. In some embodiments, sensor data related to the currents 20 may be transmitted to the drillship 10 and control of the controller 44 of the flow guide 22 may be performed based on the sensor data at the drillship 10 (e.g., remotely from the flow guide 22).

It should be noted that the controller 44 of the flow guide 22 may operate in conjunction with software systems implemented as computer executable instructions stored in a non-transitory machine readable medium 50 such as memory, a hard disk drive, or other short term and/or long term storage). Particularly, the techniques to operate the controller 44 of the flow guide 22 may be performed using include code or instructions stored in a non-transitory machine-readable medium 50 (e.g., the memory and/or storage) and may be executed, for example, by one or more processors or the controller 44 of the flow guide 22. Accordingly, the controller 44 may be an application specific integrated circuit (ASIC), one or more processors, or another processing device that interacts with one or more tangible, non-transitory, machine-readable media 50 that collectively stores instructions executable by the controller the method and actions described herein. By way of example, such machine-readable media 50 can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by the processor (e.g., controller 44) or by any general purpose or special purpose computer or other machine with a processor. In some embodiments, control of the controller 44 via implementation of code stored in a non-transitory machine-readable medium may be performed on the drillship 10.

Figure 6:
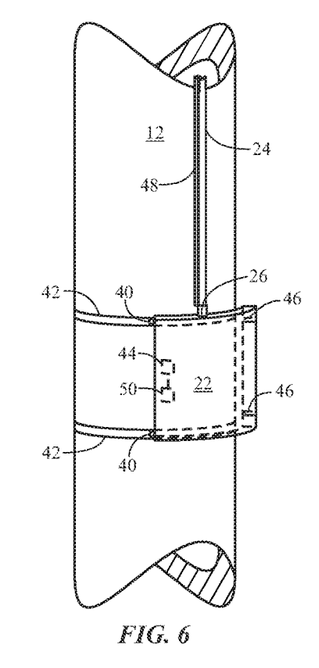
FIG. 6 illustrates a side view of a third embodiment the portion of the system of FIG. 3 identified by arrows 4, in accordance with an embodiment.

FIG. 6 illustrates a further side view of the portion of the system of FIG. 3 identified by arrows 4. As illustrated, the flow guide 22 is coupled to the riser 12 via one or more rollers 40 (e.g., wheels) that move along a track 42. The track 42 may be disposed circumferentially about the riser 12 and allow for movement of the flow guide 22 in a circumferential direction about the riser 12. Adjustments of the circumferential position of the flow guide 22 may also be made by the controller 44 of the flow guide 22. In one embodiment, the controller receives signals from one or more sensors 46, for example, disposed on the flow guide 22 or on the riser 12, which sense the flow of the currents 20. Alternatively, the sensors 46 may be strain gauge sensors that sense stresses, for example, in the riser 12. It should be noted that these sensors 46 may similarly be utilized with any of the flow guides 22 of FIGS. 3-8.

Based on the sensed conditions, the controller 44 may cause adjustments of the face 34 and/or the flow guide 22 to be made. For example, based on the sensed conditions of the currents 20 or strain in a particular region of the riser 12, the controller may cause adjustments of the flow guide 22 to be made circumferentially about the riser 12 to position the flow guide 22 relative to the currents 20, for example, to more appreciably allow for cancelation or mitigation of the forces of the currents 20. In some embodiments, sensor data related to the currents 20 may be transmitted to the drillship 10 and control of the controller 44 of the flow guide 22 may be performed based on the sensor data at the drillship 10 (e.g., remotely from the flow guide 22). For example, use of a communication link 48 (e.g., a wire, a fiber optic cable, or the like) may communicate signals between a control system located at the drillship 10 and the controller 44 and/or sensors 46.

It should be noted that the controller 44 of the flow guide 22 may operate in conjunction with software systems implemented as computer executable instructions stored in a non-transitory machine readable medium 50 such as memory, a hard disk drive, or other short term and/or long term storage. Particularly, the techniques to operate the controller of the flow guide 22 may be performed using include code or instructions stored the a non-transitory machine-readable medium 50 (e.g., the memory and/or storage) and may be executed, for example, by the one or more processors or the controller of the flow guide 22. Accordingly, the controller 44 may be an application specific integrated circuit (ASIC), one or more processors, or another processing device that interacts with one or more tangible, non-transitory, machine-readable media 50 that collectively stores instructions executable by the controller 44, the method and actions described herein. By way of example, such machine-readable media 50 can comprise RAM, ROM, EPROM, EEPROM, or optical disk storage, magnetic disk storage, or other magnetic storage devices, or any other medium which can be used to carry or store desired program code in the form of machine-executable instructions or data structures and which can be accessed by a processor (e.g., controller 44) or by any general purpose or special purpose computer or other machine with a processor. In some embodiments, control of the controller 44 via implementation of code stored in a non-transitory machine-readable medium may be performed on the drillship 10 (e.g., via a control system that includes a controller and/or processor and non-transitory machine-readable medium at the drillship 10).

In some embodiments, both the track 36 and the track 42 may be present and utilized to move the flow guide 22. In this manner, both vertical 38 and circumferential movement of the flow guide 22 may be accomplished. For example, based on the sensed conditions of the currents 20 or strain in a particular region of the riser 12, the controller 44 may cause adjustments of the flow guide 22 to be made circumferentially about the riser 12 and vertically along the riser 12 to position the flow guide 22 relative to the currents 20, for example, to more appreciably allow for cancelation or mitigation of the forces of the currents 20. In some embodiments, sensor data related to the currents 20 may be transmitted to the drillship 10 and control of the controller 44 (to adjust movement of the flow guide 22, an angle of the face 34, and/or an amount of closure of the outlets 28) may be accomplished from the drillship 10. Similarly, in some embodiments, the controller 44 in the flow guide 22 may itself control movement of the flow guide 22, an angle of the face 34, and/or an amount of closure of the outlets 28 based on, for example, feedback (e.g., signals) received from the one or more sensors 46.

Through the use of the outlets 28 as jets to flow high pressure fluid, the deflection of the riser 12 may be reduced. In some embodiments, measurements may be made relating to an angle of the riser 12 with respect to the BOP 16 and an angle of the riser with respect to a rig on the drillship 10. Deflection of the riser 12 should be reduced to maintain these angles in a predetermined range to allow for proper operation of the riser 12. To help reduce the deflection, the drillship 10 may include a control system that operates in conjunction with software systems implemented as computer executable instructions stored in a non-transitory machine readable medium such as memory, a hard disk drive, or other short term and/or long term storage. Particularly, techniques to regulate counter flow may be performed by a control mechanism (e.g., a controller or processor that executes the computer executable instructions stored in a non-transitory machine readable medium) that receives information from the communication link 48 to monitor the riser orientation (e.g., with respect to a rig of the drillship 10 and the BOP 16) and may generate counteraction procedures (e.g., activation of the flow guide 22 and/or movement of the flow guide 22). In this manner, adjustments (e.g., that may be automated) can be made to the flow guide 22 to counter or steer the riser 12 against the current to ensure the two angles discussed above remain within tolerance levels.

Figure 7:
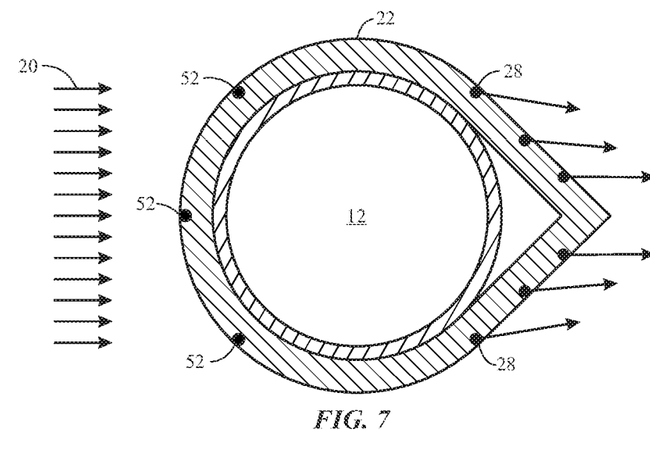
FIG. 7 illustrates a top view of a fourth embodiment the portion of the system of FIG. 4 identified by arrows 4A, in accordance with an embodiment.

Additional techniques and systems may be utilized in addition to and/or in place of those discussed above. For example, it is possible to reduce riser 12 deflection and improve drillship 10 operability by applying thrust countering the currents 20 at a particular portion of the riser 12. However, how that thrust is applied may also be varied. For example, to balance out the high current load from the environment (e.g., currents 20), a force directly working against the environment current (e.g., currents 20) may be applied. For example, outlets 28 of a flow guide 22 may be positioned such that the outlets 28 transmit high pressure fluid received from hose 24 in a direction that opposes the currents 20. FIG. 7 illustrates one example of such a flow guide 22.

FIG. 7 illustrates a top view of a flow guide 22 that may include a hollow fairing body with flow path from leading edge to trailing edge. For example, flow may be injected at the trailing edge of the airfoil of the flow guide 22 via outlets 28 to reduce flow separation. In one or more embodiments, passive inlets 52 may be included at leading edge of the flow guide 22 and may be channeled to one or more of the outlets 28. These passive inlets 52 may allow for passive rotation of the flow guide 22 to align the outlets 28 so that their flow will operate to cancel and/or mitigate the force applied to the riser 12 via the currents 20. In some embodiments, the passive inlets 52 may be directly coupled to one or more outlets 28 while the remaining outlets 28 may separately receive high pressure fluid received from hose 24. Thus, in one embodiment, separate plenum chambers may be utilized in the flow guide 22 to separate the flows from the currents 20 and the hose 24 being received by the flow guide 22. Moreover, similar to the flow guide 22 illustrated in FIGS. 5 and 6, the flow guide 22 of FIG. 7 may be installed on a roller 40 mounted on riser joints that can be self-aligned with incoming flow direction via track 42 and/or be mounted on a track 36. Additionally, the flow guide 22 of FIGS. 5 and 6 may be controlled to provide flow (e.g., thrust or jets) in a direction that opposes the currents 20, as discussed above in relation to FIG. 7. This directionality of the flow guide may be controlled, for example, by the controller 44 and/or by the control system of the drillship 10.

Figure 8:
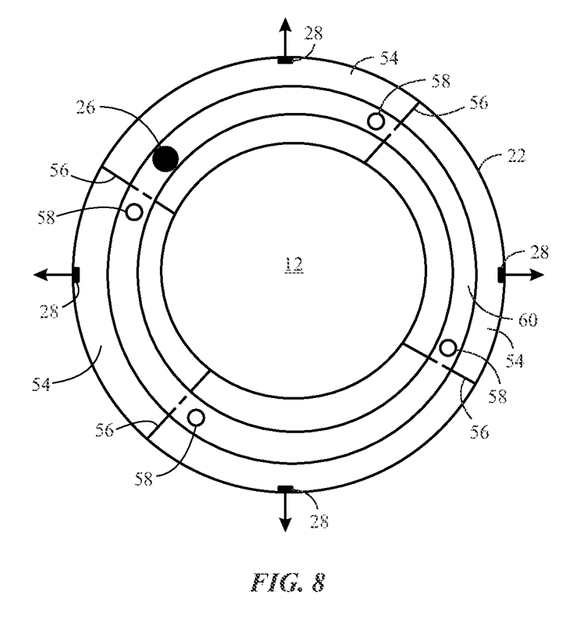
FIG. 8 illustrates a top view of a fifth embodiment the portion of the system of FIG. 4 identified by arrows 4A, in accordance with an embodiment.

FIG. 8 illustrates an additional top view of a flow guide 22 that may include outlets 28 that are positioned, for example, every 90 degrees around a circumference of the flow guide 22. In one embodiment, separate plenum chambers 54 (fluidly separated from one another by barriers 56) may be present in the flow guide 22. These plenum chambers 54 may receive the high pressure fluid via one or more valves 58 in high pressure plenum 60. In some embodiments, high pressure plenum 60 may be circumferentially disposed above the plenum chambers 54 and may be coupled to the hose 24 via the aperture 26 to receive the high pressure fluid. The operation of the valves 58 may be controlled, for example, by the controller 44 and/or by the control system of the drillship 10 to allow for the high pressure fluid to be transmitted into a particular plenum chamber 54 for venting of the fluid via outlet 28.

In some embodiments, additional valves in the plenum chambers 54 may control the amount of fluid transmitted from the outlets 28, for example, in response to current conditions detected by the sensors 46 and/or based on historical data such that operation of the separate outlets 28 may be controllable to mitigate changing currents 20 (e.g., based on time of day, season, etc.). The operation of the valves that control the amount of fluid transmitted from the outlets 28 may be controlled, for example, by the controller 44 and/or by the control system of the drillship 10. Again, the control of the valves of the flow guide 22 discussed above may ensure that the angles of the riser 12 with respect to the drillship 10 and/or the BOP 16 remain within tolerance levels.

Furthermore, with respect to the outlets 28, it is envisioned that multiple outlets 28 may exist in each plenum chamber 54. For example, multiple outlets 28 may be arranged vertically along the plenum chamber 54 and may extend along a length of the plenum chamber 54 for approximately 25 feet, 50 feet, 75 feet, 100 feet, or another distance. Alternatively, one outlet 28 (e.g., disposed as a slit or other aperture) may extend vertically along the plenum chamber 54 and may extend along a length of the plenum chamber 54 for approximately 25 feet, 50 feet, 75 feet, 100 feet, or another distance. It is envisioned that the number, size, arrangement, and distance that the one or more outlets 28 occupy may be, for example, a function of the surface area of the flow guide and the desired strength of the flow exiting the flow guide 22.

Figure 9:
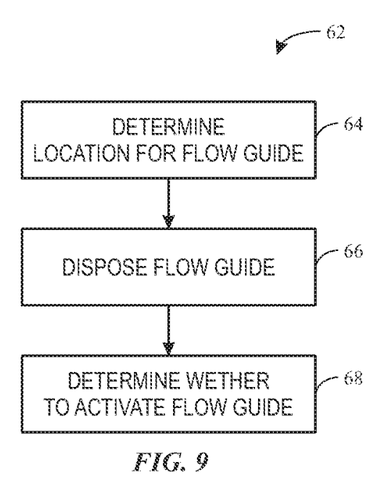
FIG. 9 illustrates a flow chart related to mitigation of the deflection of the riser of FIG. 2, in accordance with an embodiment.

FIG. 9 illustrates a flow chart 62 used in conjunction with the installation and operation of the flow guide 22 discussed above in FIGS. 3-8. In step 64, the location for the flow guide 22 along riser 12 is determined. In some embodiments, charts may be developed based on measurements of the currents 20 at a particular drill site. Table 1 illustrates an example of such a chart:

TABLE 1

| Depth (ft) | 1 yr | 10 yr |
| --- | --- | --- |
| 0 | 5.3 | 5.9 |
| 164 | 4.3 | 4.7 |
| 328 | 3.8 | 4.2 |
| 459 | 3.3 | 3.6 |
| 755 | 2.0 | 2.2 |
| 1115 | 1.6 | 2.1 |
| 1362 | 1.6 | 2.0 |
| 1788 | 1.2 | 1.3 |
| 2100 | 1.2 | 1.6 |
| 2461 | 1.5 | 2.3 |
| 3002 | 2.0 | 2.2 |
| 3412 | 2.0 | 2.9 |
| 4577 | 0.0 | 0.0 |

Table 1 describes the speed of currents 20 at particular depths over periods of time, for example, one year and ten years. Using this information, a determination of the location (e.g., depth) of the flow guide 22 can be made in step 64. Once this determination is made, disposing the flow guide 22 in step 66 may occur. However, it may be appreciated that other information separate from or in addition to the information of Table 1 may be used in determining a location and/or number of one or more the flow guides 22, as set forth in step 64.

In some embodiments, in step 66, the flow guide 22 may be disposed directly onto a riser 12 prior the riser 12 being lowered into the sea (e.g., on the drillship 10 while the riser 12 is being made up). In some embodiments, the flow guide 22 may be attachable via fasteners (e.g., screws, bolts, or the like) or locking mechanisms (e.g., pins or the like) to any riser 12 or the riser 12 may be premade with the flow guide 22 attached thereto (e.g., welded thereto).

In other embodiments, the flow guide 22 may be affixed to separate joints, such as a pup joint (e.g., drill pipe of a predetermined length used to adjust the length of the drill string/riser). For example, the flow guide 22 may be may be attachable via fasteners (e.g., screws, bolts, or the like) or locking mechanisms (e.g., pins or the like) to the pup joint or the pup joint may be premade with the flow guide 22 attached (e.g., welded) thereto. In this manner, the flow guide 22 may be attached to a selectable position of the riser 12 while still utilizing standardized riser joints. Furthermore, the hose 24 may be clamped or otherwise affixed to the riser 12 or the pup joint and wound about the riser 12 in a helical manner, so as to reduce movement of the riser 12 due to vortex shedding from currents 20.

Alternatively, in step 66, the flow guide 22 may be affixed to the riser 12 or a pup joint once disposed in the sea (e.g., once the riser 12 is deployed). For example, a Remotely Operated Vehicles (ROV) may be utilized to affix the flow guide 22 to the riser 12 or pup joint in step 66. An ROV may be a remotely controllable robot/submersible vessel with that may be controlled from the drillship 10. The ROV may move to a selected point in the riser 12 (in a helical manner to wrap the hose 24 about the riser) and may couple the flow guide 22 to the riser 12 at the position determined in step 64. In some embodiments, one or more flow guides 22 may be, at separate points, affixed to the riser 12 and/or a pup joint either during make up of the riser 12 or once the riser 12 is deployed. The separate flow guides 22 may be independently controllable relative to currents 20 impacting the respective flow guides 22.

In step 68, control of the flow guide 22 may occur. This may be performed by a user on the drillship (for example, activating the flow of the fluid to be transmitted to the flow guide 22) and/or may be done automatically by one or both of the control system of the drillship 10 and the controller 44 of the flow guide 22. Step 68 includes determining whether to activate the flow guide 22, which may include determining whether to orient or move the flow guide 22 as discussed above. Also contemplated in step 68 is the deactivation of the flow guide 22 (e.g., halting the flow of fluid to the flow guide 22). This may be performed, for example, when it is determined that the currents 20 are not sufficient to alter the angles of the riser 12 with respect to the drillship 10 and/or the BOP 16 remain will remain in their respective tolerance levels.

This written description uses examples to disclose the above description, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Accordingly, while the above disclosed embodiments may be susceptible to various modifications and alternative forms, specific embodiments have been shown by way of example in the drawings and have been described in detail herein. However, it should be understood that the embodiments are not intended to be limited to the particular forms disclosed. Rather, the disclosed embodiment are to cover all modifications, equivalents, and alternatives falling within the spirit and scope of the embodiments as defined by the following appended claims.

What is claimed is:

1. A device, comprising: a flow guide configured to be coupled to a riser of an offshore vessel such that the flow guide wraps around the riser perimeter and contacts only a portion of a circumference of the riser forming an arc therewith, wherein the flow guide comprises an aperture configured to receive a fluid, wherein the flow guide comprises at least one outlet configured to transmit the fluid in a direction away from the riser so as to reduce deflection in the riser caused by a current.

2. The device of claim 1, wherein the flow guide comprises a plenum coupled to the aperture and the at least one outlet and configured to house the fluid.

3. The device of claim 1, comprising a face comprising the at least one outlet.

4. The device of claim 3, wherein the face is adjustable to alter an orientation of the at least one outlet to transmit the fluid orthogonal to a direction of the current.

5. The device of claim 1, comprising a track coupled to the flow guide and the riser, wherein the track is configured to allow for movement of the flow guide along a surface of the riser.

6. The device of claim 5, wherein the flow guide comprises a controller and a sensor coupled to the controller.

7. The device of claim 6, wherein the controller is configured to cause the movement of the flow guide along the surface of the riser in response to a signal generated by the sensor indicative of a sensed conditions of the current or strain in the riser.

8. The device of claim 1, comprising tubing coupled to the aperture and configured to transmit the fluid to the device.

9. The device of claim 1, wherein the aperture is configured to receive the fluid from the current.

10. The device of claim 9, wherein flow guide is configured to rotate about the riser based upon the fluid received from the current.

11. A method, comprising: disposing a flow guide on a portion of a riser of an offshore vessel such that the flow guide wraps around the riser perimeter and contacts only a portion of a circumference of the, riser forming an arc therewith, wherein the flow guide comprises at least one outlet configured to transmit a fluid in a direction away from the riser to reduce deflection in the riser caused by a current.

12. The method of claim 11, comprising disposing the flow guide on a riser joint as the portion of the riser of the offshore vessel.

13. The method of claim 11, comprising disposing the flow guide on a pup joint as the portion of the riser of the offshore vessel.

14. The method of claim 11, comprising disposing the flow guide on the portion of the riser of the offshore vessel prior the portion of the riser being lowered into a body of water.

15. The method of claim 11, comprising disposing the flow guide on the portion of the riser of the offshore vessel subsequent to the portion of the riser being lowered into a body of water.

16. The method of claim 11, comprising disposing a second flow guide on a second portion of the riser of the offshore vessel, wherein the first portion of the riser and the second portion of the riser comprise distinct vertical portions of the riser.

17. The method of claim 11, comprising determining where to dispose the flow guide on the riser based upon a speed of the current at a particular depth from the offshore vessel.

18. The method of claim 11, comprising affixing tubing to the riser of the offshore vessel in a manner to reduce movement of the riser due to vortex shedding or vortex induced vibration from the current, wherein the tubing is configured to transmit the fluid to the flow guide.

19. A system, comprising: a segment of a riser of an offshore vessel; and a flow guide configured to be coupled to the segment such that the flow guide wraps around the segment of the riser perimeter and contacts only a portion of a circumference of the segment of the, riser forming an arc therewith, wherein the flow guide comprises an aperture configured to receive a fluid, wherein the flow guide comprises at least one outlet configured to transmit the fluid in a direction away from the riser so as to reduce deflection in the riser caused by a current.

20. The system of claim 19, comprising a track disposed on the segment and configured to be coupled to the flow guide, wherein the track is configured to allow for movement of the flow guide along a surface of the segment.

* * * * *